Nov. 12, 1929.                    E. MARLIERE                    1,735,770
                                SECURING DEVICE
                              Filed Aug. 11, 1926
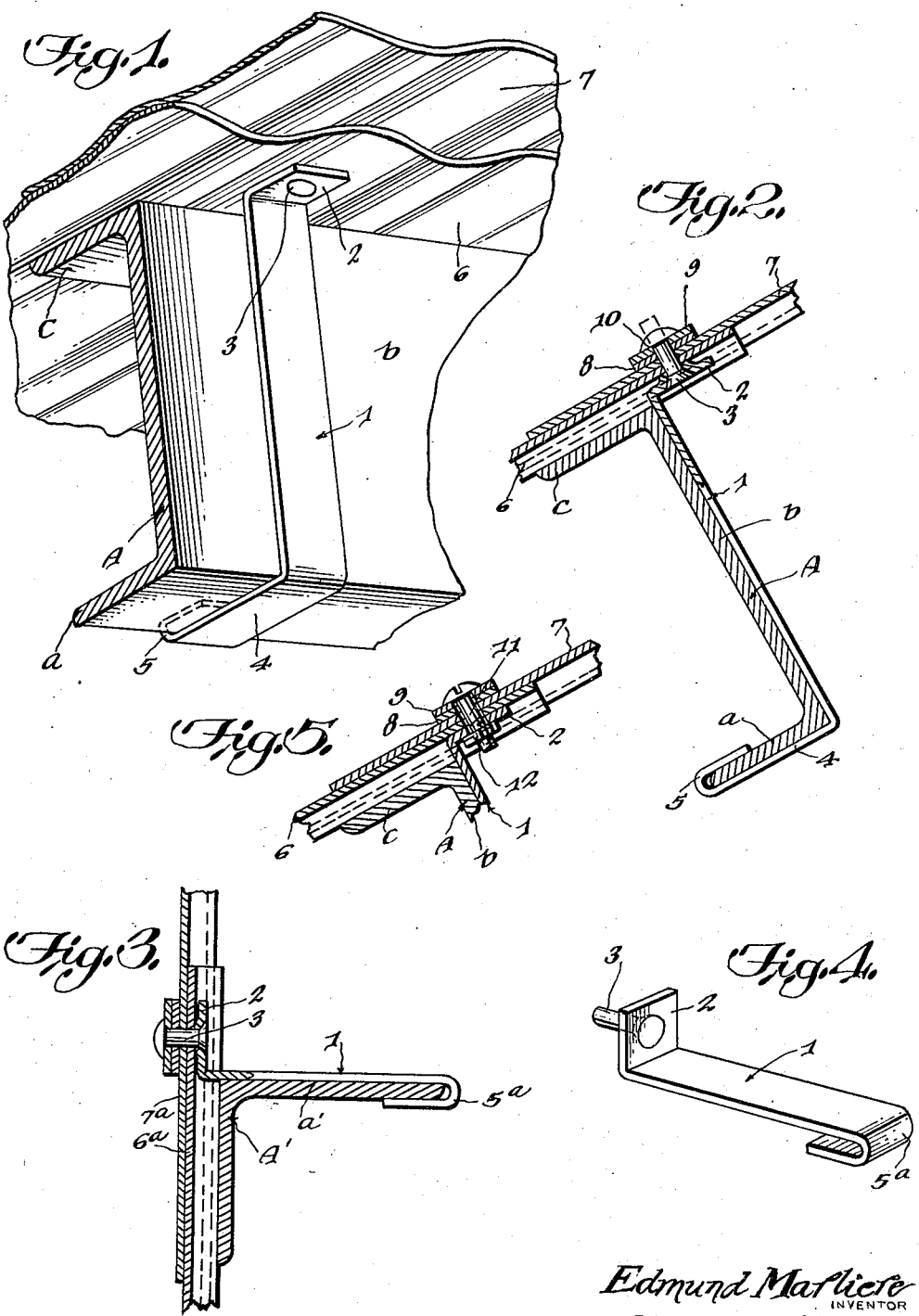

Patented Nov. 12, 1929

1,735,770

UNITED STATES PATENT OFFICE

EDMUND MARLIERE, OF LA SALLE, ILLINOIS

SECURING DEVICE

Application filed August 11, 1926. Serial No. 128,664.

This invention relates to securing devices, and more particularly to a fastener adapted for securing sheet material of various sorts.

One of the main objects of the invention is to provide a fastener of this character of simple and inexpensive construction which can be readily applied and is particularly adapted for use in the construction of structures having coverings of sheet materials, such as sheet metal, sheet asbestos, and other materials ordinarily used for this purpose. A further object is to provide a fastener of this character having permanently associated therewith an element adapted to be secured through the sheet material, this element forming wtih the body of the fastener a complete unit or securing device. Further objects will appear from the detailed description.

In the drawings:

Fig. 1 is a perspective view of the fastener as applied.

Fig. 2 is a sectional view showing the fastener as used for securing the sheets of a roof structure.

Fig. 3 is a sectional view showing a modified form of the fastener used for securing the sheets of the side wall of a structure.

Fig. 4 is a perspective view of the form of fastener shown in Fig. 3.

Fig. 5 is a sectional view of another modified form as applied.

In Figures 1 and 2 I have illustrated a form of fastener which includes an elongated body portion 1 bent at right angles at its upper end to provide a head 2 with which is permanently associated a rivet 3 which is secured in the head in any suitable manner. The fastener, at the lower end of body 1, is bent reversely to head 2 to form an arm 4 which is turned upwardly and inwardly forming a hook element 5. This hook element is adapted for engagement over the lower flange $a$ of a channel member A such as commonly used in roof structures. The arm 3 is of such length that the body 1 fits closely against the outer face of the web portion $b$ of channel A. Body 1 is of such length as to project slightly above the upper flange $c$ of the channel member into a corrugation of the lower sheet 6 of two lapping sheets 6 and 7 of a roof structure. The sheets 6 and 7 can be formed of sheet metal, asbestos, or other materials ordinarily used for this purpose. In using the fastener the sheets 6 and 7 are placed in proper overlapping relation after which hook 5 is engaged over flange $a$ of channel member A and the rivet 3 is pressed upwardly by means of a dolly bar applied thereto by a workman within the structure being erected. A second workman on the outside then forces the sheets 6 and 7 downwardly about the rivet 3 by means of a suitable set thus causing the rivet to penetrate the overlapping sheets and project beyond the same. After this has been done, preferably, though not necessarily, I place a lead washer 8 and a steel washer 9 about the projecting portion of the rivet, after which the rivet is headed at 10. As the rivet 3 is permanently associated with the fastener, and the fastener is shaped to readily engage about and contact with the channel member A, the fasteners can be applied and the sheets secured by the rivets with a minimum of time and effort by two men, thus effecting a very material saving in the cost of applying sheet materials to roofs and other structures.

In Fig. 3 I have illustrated a modified form of fastener which is well adapted for use in securing sheets 6ª and 7ª of material on the side or vertical walls of structures. This fastener includes a body 1 having one end bent to form a hook 5ª adapted for engagement over flange $a'$ of an angle bar A'. The use of the fastener and its application is the same as that illustrated and described in Figs. 1 and 2 with the exception that the fastener is used in connection with an angle bar instead of a channel member.

In Fig. 5 I have illustrated a form in which the rivet 3 is replaced by a stove bolt 11 which passes through head 2, a nut 12 being threaded onto this bolt.

As will be understood, and as indicated above, changes in construction and arrangement of parts of the invention may be resorted to without departing from the field and scope of the same, and I intend to include all such variations, as fall within the scope of the appended claims, in this application in which the preferred forms only of my invention are disclosed.

What I claim is:

1. In a fastener of the character stated, a body provided at one end with a hook shaped element adapted for engagement over a flange of a supporting member; said body being provided at its other end with a right angularly extending head disposed oppositely to the hook member, and a rivet carried by and permanently associated with the head and projecting at right angles thereto.

2. In a fastener of the character described, a body provided at one end with a right angularly disposed head and at its other end with a right angularly disposed arm directed oppositely to said head, the arm being provided at its free end with a hook element adapted for engagement over a flange of a supporting member, and a rivet carried by and permanently associated with the head and projecting at right angles thereto.

3. In a fastener of the character described, a body provided at one end with a unitary right angularly disposed head and at its other end with a unitary right angularly disposed arm directed oppositely to the head and provided at its free end with a unitary hook member adapted for engagement over a flange of a supporting member.

4. In a fastener of the character stated, a substantially flat strip having a portion bent at right angles to the main extent thereof, a hook formed on the end of said right angularly extending portion, another right angularly extending portion at the opposite end of said main portion disposed to extend opposite to said first named right angularly extending portion, and a rivet mounted in said last named portion at right angles thereto and disposed to extend away from said main portion.

5. A fastener of the character described including a substantially flat strip having a portion bent at right-angles to the main extent thereof, a hook formed on the free end of said right-angularly extending portion adapted to embrace the flange of a supporting member when the main extent of said strip is disposed against the main face of said supporting member, and another right-angularly extending portion at the opposite end of the main extent of said strip adapted to extend therefrom in a direction opposite to that in which said first named right-angularly extending portion is extended, and a rivet mounted in said last named portion adapted to extend outwardly therefrom in a direction away from said main extent whereby to hold a member in position such that the stress impressed from said member on said strip will be impressed on the main extent of said strip on to the face of said supporting member.

In testimony whereof I affix my signature.

EDMUND MARLIERE.